United States Patent [19]
Murphy

[11] 3,958,770
[45] May 25, 1976

[54] OPEN FACED FISHING REEL WITH DEPTH MEMORY

[75] Inventor: Joseph C. Murphy, Tulsa, Okla.

[73] Assignee: St. Croix Corporation, Minneapolis, Minn.

[22] Filed: Nov. 19, 1974

[21] Appl. No.: 525,077

[52] U.S. Cl. ............................................. 242/84.1 L
[51] Int. Cl.² ............................................. A01K 89/00
[58] Field of Search ................. 242/84.2 R, 84.1 R, 242/84.1 L, 84.1 M

[56] References Cited
UNITED STATES PATENTS

| | | | |
|---|---|---|---|
| 2,941,748 | 6/1960 | Mathiesen | 242/84.1 L |
| 3,085,765 | 4/1963 | Ulrich | 242/84.1 L |
| 3,176,929 | 4/1965 | Britt | 242/84.1 L |
| 3,465,982 | 9/1969 | Coshow | 242/84.1 L |
| 3,730,455 | 5/1973 | Murphy | 242/84.1 L |

*Primary Examiner*—Edward J. McCarthy
*Attorney, Agent, or Firm*—Dorsey, Marquart, Windhorst, West & Halladay

[57] ABSTRACT

A depth memory device to be utilized with an open faced fishing reel which, when engaged, permits a desired length of line to be reeled in and then that same length of line to be unreeled upon the next cast so that the angler can return his lure to the same depth. The memory device is in the form of a levered tension arm pivotally attached within and to the outer edge of the spool associated with the fishing reel. When engaged it is releasably locked into place by a leaf spring. The tension and formation of the leaf spring is such that if sufficient force is exerted on the line the leaf spring will release the arm of the memory device, which will be returned to its disengaged position due to the action of a torsion spring associated with the arm.

13 Claims, 5 Drawing Figures

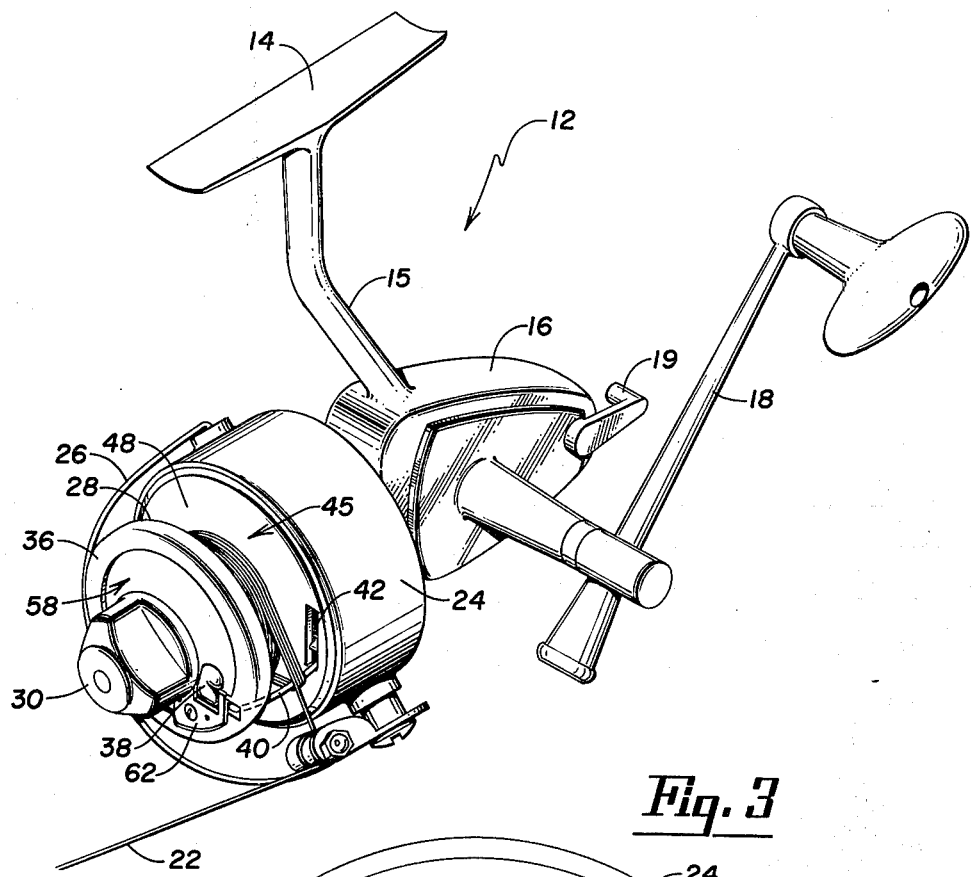
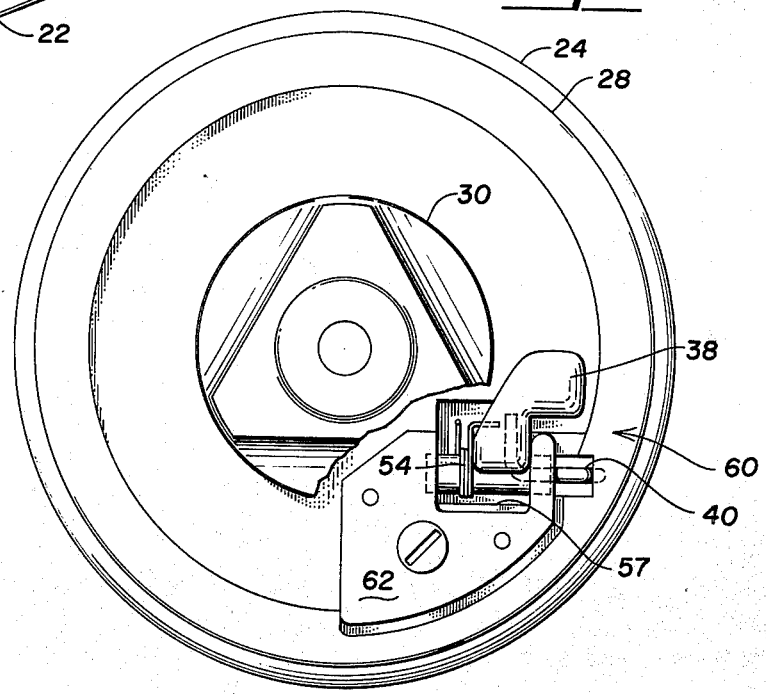

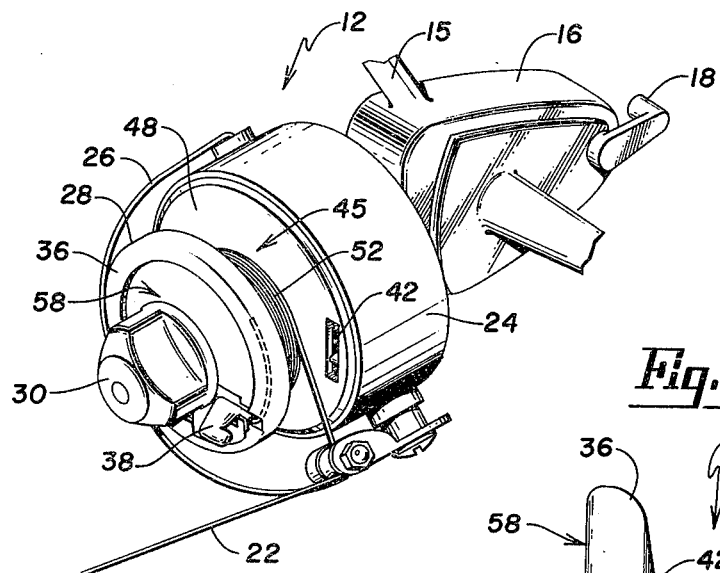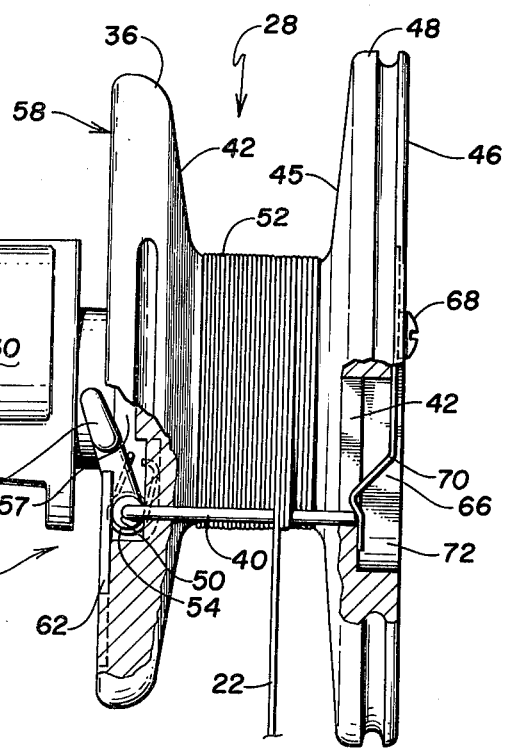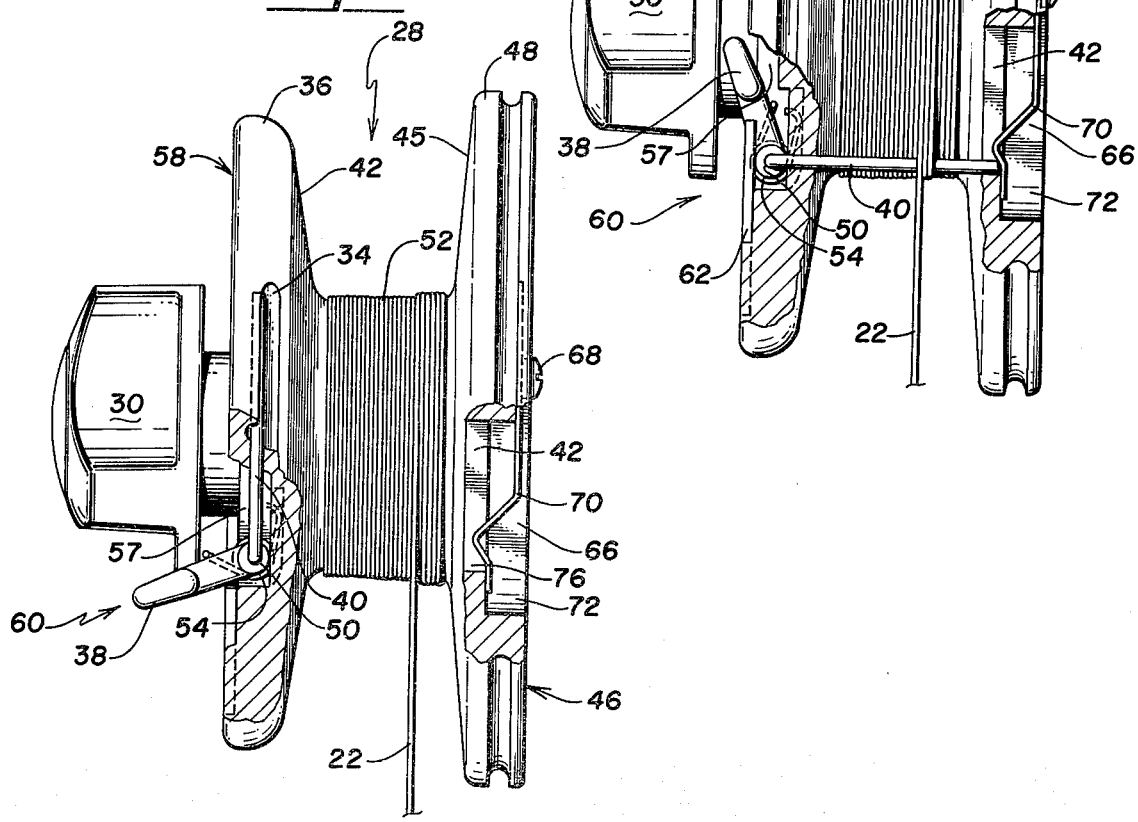

OPEN FACED FISHING REEL WITH DEPTH MEMORY

BACKGROUND OF THE INVENTION

Fishing reels of the past have been provided with means for holding fishing line on a spool. The operating mechanism is usually a pin which is locked into position across the remaining line on the spool. After an initial cast to a desired depth the line is rewound about the spool with the pin in its locked position and the rewound line is wound above the pin. Upon subsequent casts of the line the rewound line plays out until the pin is reached. Since the next loop of line is disposed under the pin it will be prevented by the pin from unwinding. In this manner, the angler may repeatedly return his lure to the same depth as the depth at which he originally set the pin. If the angler wishes to change the depth at which he wishes to fish, he must manually retract the pin or it must be retracted automatically again moving substantially parallel to the axis in the reverse direction.

The pin utilized in the prior art devices is normally, in both its disengaged and engaged positions, substantially parallel to the axis of the spool. When holding of a portion of the line is desired this pin is either canted to engage the periphery of the spool or inserted through apertures in the spool. If the pin is spaced from the spool and canted to lock or hold the line, the pin must necessarily be positioned beyond the outer diameter of the spool and this creates the problem of catching it or accidentally tripping it. Prior art reels which employ a pin inserted through apertures in the spool also must either have the locking pin extend the length of the pin beyond the spool with the aforementioned disadvantages or must provide housing for the pin, and an actuating mechanism extending through the housing, usually in the vicinity of the handle or base of the reel again with the attendant possibility of accidentally catching or tripping it.

In the prior art devices, except for U.S. Pat. No. 3,730,455, there is no provision to automatically release the line in the event the angler forgets to manually release the lock prior to attempting a cast to a greater distance. In the aforementioned patent the release mechanism is automatic, however, it too has the parallel advance of the pin which creates housing requirements and requires activating means extending beyond the radius of reel in the vicinity of the handle and base of the reel.

SUMMARY OF THE INVENTION

The present invention provides a depth memory mechanism which is relatively simple and inexpensive to manufacture, easy to operate, maintain and repair, and rugged and durable in use. It is controlled by an activating lever positioned on the outer portion of the spool and when disengaged lies within a cavity in the spool so that it is unlikely that it will be accidentally engaged or disengaged. The memory arm pivotally moves from a disengaged position which is generally perpendicular to the axis of the spool to an engaged position which is parallel to the axis of the spool. The outer end of the memory arm is releasably locked into place by a notched leaf spring which is tensioned in a manner such that if a force is exerted on the line which is greater than that which would normally be experienced, such as if the angler attempts to cast to a greater distance, catches a fish or the line becomes snagged on an obstruction below the water, the memory arm will override the tension of the engaging leaf spring and permit the arm, which is biased towards its disengaged position, to return to its disengaged position. Since the operating portion of the device is within the confines of the spool away from the hands of the operator when casting the apparatus is functional without the difficulties experienced with the prior art devices.

Other objectives and advantages of the present invention will become apparent from a consideration of the following description in connection with the drawings.

DESCRIPTION OF THE DRAWINGS

FIG. 1 is a perspective view of an open faced fishing reel with the depth memory device in its engaged position;

FIG. 2 is a perspective view of an open faced fishing reel with the depth memory device disengaged;

FIG. 3 is an end view of an open faced fishing reel partially broken away showing the clamping mechanism which holds the actuating lever and the locking rod to the outer rim of the spool; and FIGS. 4 and 5 are side views of the reel partially in section showing the locking rod in its disengaged position in FIG. 4 and in its engaged position in FIG. 5.

DESCRIPTION OF THE PREFERRED EMBODIMENT

Referring to FIGS. 1 and 2, an open faced fishing reel is shown and designated generally by the numeral 12. The fishing reel may be mounted on a fishing rod with a mounting bracket 14 which is attached by a neck or mounting rod 15 to the gear housing 16 of the reel 12. The gearing (not shown) contained in the gear housing 16 may be the conventional pinion gears or the like. The gear is rotated manually with the use of a handle 18 as is conventionally done.

A conventional drag lever 19 may be attached to and penetrate through the gear housing 16 so that drag may be put on the line 22 after casting and while fishing. Also attached to the gear housing 16 is a support housing 24 for the bail 26 and spool 28 of the fishing reel 12 through which motion of the gearing is transferred to the spool 28. The spool 28 is a conventional spool with modifications which comprise applicant's invention. The spool 28 is held to the shaft of the reel 12 by a drag knob 30 which contains a clutch mechanism as is conventional in the art. Finally, a conventional bail mechanism 26 is attached to the support housing 24 and operates in a conventional manner.

The improvement of the instant invention is a memory depth device, the movable portion of which is retained in a recess 34 formed in the outer member 36 of the spool which may be pivotally rotated, by depressing a lever 38, to a position which is parallel to the axis of the spool 28. As shown most clearly in FIGS. 1 and 5, an arm 40 passes from a recess 34 formed in the inner surface 42 of the outer member 36 of the spool 28 to a recess 42 formed in the inner surface 45 of the inner member 48 of the spool 28. The arm 40 is pivotally attached to the outer member 36 of the spool 28 by a journaled connection 50 to the spool 28. It is fixedly secured as by welding to the lever 38 so that when the lever 38 is rotated the arm 40 rotates across the filaments 52.

To maintain the arm 40 in its disengaged position and to return it to that position after it has been released the arm 40 is biased by a torsion spring 54 which is wrapped helically around the journaled connection 54 to engage the bottom of a recess 57 formed in the outer surface 58 of the outer member 36 of the spool 28 and further engages the lever assembly 60 as shown in FIGS. 3 and 4. The mechanism is fixed to the spool 28 by a clamp 62 which is screwed to the outer surface 58 of the spool 28.

The locking mechanism 66 on the other face 45 of the spool 28 which provides the tensioned release is accomplished by a slot 42 in the inner surface 45 of the spool 28 which communicates with a recess 72 formed in the outer surface 46 of the inner member 48 of the spool 28. In the recess 72 is fixed, as by screwing it to the spool 28 with a screw 68, a leaf spring 70.

The leaf spring 70 is deformed to provide a notch 76 between the deformation and the edge of the slot 42. The leaf spring 70 extends beyond the edge of the slot 42 and thus its unsecured end is restrained by the depth of the recess 72 in the outer surface 46 of the inner member 48 of the spool 28.

In this manner, if the tension on the line 22 creates a pressure on the arm 40 which is sufficient to release the leaf spring 70, the leaf spring 70 will be bent downwardly, or to the right in FIG. 5, to release the arm 40. Once the arm 40 is released the torsion spring 54 will return the arm 40 to its original disengaged position so it will not interfere with the pay out of more line 52.

The operation of the reel 12 is as follows. With the bail 26 released and the parts in the position of FIGS. 2 and 4 the angler is free to cast his lure and to pay out or wind in his line 22 until his bait is at a desirable depth. At that time the angler depresses the depth memory lever 38 to rotate the arm 40 from its disengaged position shown in FIGS. 2 and 4 to its engaged position shown in FIGS. 1, 3 and 5 against the action of the torsion spring 54. The arm 40 rotates from its position perpendicular to the axis of the reel 12 to a position parallel to the axis of the reel 12. The outermost end of the arm depresses the deformation formed in the leaf spring 70. As it passes the apex of the bend it slides into the notch 76 formed between the bend in the leaf spring 70 and the edge of the slot 42 in the surface 45 of the spool 28. The arm 40 is thus held against retraction.

As explained above the line 22 can then be wound in by rotation of the handle 18, and hence the spool 28, and in successive turns of line 22 will be wound about the spool 28 and will overlie the arm 40. The other turns of line 52 on the spool 28, that is, those which were not unwound in the first place, will all lie beneath the arm 40.

When the angler again pays out the line 22 to return his bait to its previous position and depth, the turns of the line 22 that overlie the arm 40 will unwind until the previous position and depth of the lure is reached. The next turn of line 52 which is the first of the remaining turns that underlie the arm 40, cannot unwind because the arm 40 overlies it, and so the lure will be retained at the previous or desired depth. Should the angler desire to disable the lock provided by arm 40 he has only to rotate the lever 38, which rotates the arm 40 past the bend in the leaf spring 70. Thereupon, the tension coil 54 of the spring will urge the arm 40 to rotate back into the outermost member 36 of the spool 28 as shown in FIG. 4, the arm 40 then being contained in the recess 38 or slot in the spool 28.

In addition, the lock provided by the arm 40 is automatically disengaged under certain conditions, more specifically, upon an increase in tension in the line 22 above a certain predetermined value. This occurs because a relatively strong pull along the line 22 is sufficient to raise the arm 40 against the action of the leaf spring 70 so that the arm 40 is disengaged from the notch 76 between the leaf spring 70 and the slot 42 and the coil compression spring 54 will return the arm 40 to the retracted position shown in FIG. 4.

Thus, for example, if the angler were to forget that the lock is engaged and attempt to cast to a greater distance than can be permitted by the coils of line 52 that overlie the pin, his cast would be aborted if the lock were to hold. But the momentum of the bait may exert a sufficient pull on the line 22 to raise the arm 40 when the previous length of line 22 is exceeded, thereby automatically releasing the lock. Another very important occasion is the catching of a fish. The increased tension on the line 22 resulting from hooking the fish releases the depth memory means 40 thus leaving the normal drag on the line 22 rather than a locked reel. Other excessive pulls on the line 22 occurring for various reasons will also release the lock so that the unfortunate circumstances resulting from overload or a locked reel are avoided.

From a consideration of the foregoing disclosure it should be obvious that the invention is a simply constructed and economically manufactured lock which is not susceptible to the disadvantages of the prior art. It should be understood that modifications and variations may be resorted to without departing from the spirit of the invention as those skilled in the art will readily understand. Such modifications and variations are considered to be within the purview and scope of the present invention as defined by the following claims.

Having described my invention I claim:

1. In a fishing reel having a spool and fishing line wound around the spool for casting, the improvement comprising
    pivotally mounted depth memory means for limiting the amount of line to be cast comprising,
        a pivotally movable arm which may be positioned so that a plurality of turns of line can be wound about the spool and over the arm while the turns of line beneath the arm are prevented by the arm from unwinding; and
        biasing means associated with the pivotally movable arm for biasing the arm to the disengaged position.

2. The improvement of claim 1 wherein the biasing means comprise a torsion spring associated with the pivotally movable arm.

3. The apparatus of claim 1 wherein the fishing reel is an open faced fishing reel.

4. The improvement of claim 1 wherein the pivotally mounted arm can be selectively engaged and when engaged is positioned parallel to the axis of the spool and when disengaged is positioned perpendicular to the axis of the spool so that the line is free to wind on and unwind from the spool without hindrance from the arm.

5. The improvement of claim 1 wherein the pivotally mounted depth memory means further comprises a lever assembly attached to the pivotally movable arm associated with the torsion spring for moving the arm from its disengaged position to its engaged position and from its engaged position to its disengaged position.

6. The improvement of claim 1 wherein the pivotally mounted depth memory means further comprises means to releasably retain said arm in the engaged position responsive to tension in the line above a predetermined value for releasing the arm.

7. The improvement of claim 6 wherein the means to releasably retain the arm comprises a leaf spring.

8. The improvement of claim 7 wherein the leaf spring is deformed to provide a notch to retain the arm against the pressure from the biasing means.

9. The improvement of claim 6 wherein the spool has an outer and an inner member and further comprising a recess formed in the inner surface of the inner member of the spool and wherein the means for releasably retaining the arm is positioned in the recess so formed.

10. The improvement of claim 1 wherein the spool has an outer member and an inner member and the pivotally movable arm is mounted on the outer member of the spool.

11. The improvement of claim 10 wherein a recess is formed in the inner surface of the outer member of the spool and wherein the arm in its disengaged position is retained in the recess so formed.

12. The improvement of claim 11 wherein a recess is formed in the outer surface of the outer member and the lever assembly is operatively positioned in the recess formed in the outer surface of the outer member so that both the lever assembly and the rotatable arm are at all times located within the outer diameter of the spool.

13. The improvement of claim 12 wherein the lever assembly and biasing means are held in the outer surface of the outer member by clamping means fixedly secured to the outer surface of the outer member of the spool.

* * * * *